Jan. 22, 1974     I. BLANK     3,787,378

OPTICAL CONTACT LENSES AND RELATED DEVICES

Original Filed May 3, 1971

United States Patent Office 3,787,378
Patented Jan. 22, 1974

3,787,378
OPTICAL CONTACT LENSES AND RELATED DEVICES
Izhak Blank, Haifa, Israel, assignor to Hydrophilics International, Inc., New York, N.Y.
Application May 3, 1971, Ser. No. 139,545, which is a continuation-in-part of abandoned application Ser. No. 36,931, May 13, 1970. Divided and this application Jan. 24, 1973, Ser. No. 326,180
Int. Cl. C08f 15/14, 15/18
U.S. Cl. 260—86.1 R
9 Claims

ABSTRACT OF THE DISCLOSURE

A copolymer having hydrophilic surfaces is formed through the bulk copolymerization of methyl methacrylate and acrylic acid, in particular ranges, followed by a treatment of the formed copolymer with a mild, basic material, such as ammonium hydroxide, in order to neutralize the acid groups present. The depth of penetration of the basic material determines the degree to which the material is hydrophilic. A therapeutic agent may be incorporated into the copolymer after treatment.

CROSS-REFERENCES TO RELATED APPLICATIONS

This application is a division of my copending application Ser. No. 139,545, "Optical Contact Lenses and Related Devices," filed May 3, 1971, now U.S. Pat. No. 3,728,317, which was a continuation-in-part of my copending application Ser. No. 36,931, "Hydrophilic Copolymer," filed May 13, 1970, now abandoned.

BACKGROUND OF THE INVENTION

Acrylic polymers, such as polymethyl methacrylate, are completely hydrophobic, and thus resistant to any water absorption. However, such materials have excellent optical properties and are particularly desirable for materials, such as contact lenses, where their optical clarity, light transmission, and chemical inertness are particularly valuable. However, as the eye is always covered with a layer of fluid, the hydrophobic nature of the polymethyl methacrylate causes considerable irritation in the eye because its presence impedes liquid circulation. The problem also exists when attempting to employ this polymer in other artificial body members.

Attempts have been made to produce hydrophilic acrylic polymers, for example, by copolymerization with the acrylic material, such as methyl methacrylate, of a second comonomer, which has, or may be reacted to contain, hydroxy groups. Further, attempts have been made to polymerize or copolymerize such materials in the presence of water, so that large amounts of water remain in the resulting gelled polymer or copolymer. However, because the resulting copolymer completely absorbs water, its optical properties are adversely affected and, further, bacterial infection is made easier because of the physical nature of the gel and the amount of water contained in its volume. Copolymers of this type are described in the prior art, for example, in United States Letters Pat. No. 2,976,576—Wichterle et al. and United States Letters Pat. No. 3,200,960—Wichterle.

A further synthetic material formed for the purposes set forth in this invention is described in United States Letters Pat. No. 3,221,083—Crandon. The material generally employed is a copolymer of allyldiglycolcarbonate with maleic anhydride or glycidyl methacrylate. This copolymer is hydrolyzed, under stringent conditions, to yield a hydrophilic material. Hydrolysis is said to be extremely difficult if methyl methacrylate is the comomomer with allyldiglycolcarbonate.

Other references, such as "Surface Reactions of Copolymers," Seymour et al., Industrial and Engineering Chemistry, vol. 41, No. 7, pp. 1479 et seq., have also shown the treatment of copolymers, similar to those described herein, with basic materials. However, in each case, the conditions are extremely stringent such that the resulting material, while potentially possessing hydrophilic properties, cannot be successfully employed as a contact lens or artificial body member because of its lack of structural strength.

SUMMARY OF THE INVENTION

In accordance with the present invention methyl methacrylate and a second acrylic polymer are copolymerized, in bulk, in a casting cell. Generally, the amount of methyl methacrylate employed is from 75 to 92 percent, with from 8 to 25 percent of the second acrylic polymer, preferably acrylic acid. Various other materials may be incorporated into the copolymerizing mixture, including cross-linking agents, plasticizers, etc. Also incorporated is a polymerization catalyst, such as a peroxide, an azo compound, etc.

In bulk copolymerization, the copolymerizing mixture is initially heated within the casting cell at a temperature of from about 40° C. to 65° C., preferably at a temperature of 45° C. to 55° C. The copolymerizing mixture is then heated to a temperature of from approximately 80° C. to 95° C. When polymerization has been completed, the copolymer is cooled and is removed from the casting cell. Obviously, the casting cell may be formed in various shapes, depending upon the end use in which the copolymer is to be employed.

The copolymer, upon removal from the casting cell, is completely hydrophobic. It can be left in water for many hours with no significant increase in weight. However, the copolymer can be cut and shaped into lenses employing known techniques and, because of its hydrophobic nature, these lenses can be wet polished, employing the materials and methods commonly used with polymethyl methacrylate.

For formation of the products of the present invention, the lenses formed from the copolymer of the present invention in its hydrophobic state are treated with a dilute basic solution, such as an aqueous solution of ammonium or sodium hydroxide. The depth of treatment is determined both by the concentration of the solution, and by the time that the copolymer is allowed to remain in contact with the solution. The treatment involves the neutralization of the acid groups of the copolymer, but the concentration, time, and temperature of treatment are such as to preclude any reaction with the ester groups of the copolymer. When the material is to be employed as a contact lens, it is preferably left in the basic solution for a sufficient period of time to render it completely hydrophilic. This is achieved by total neutralization of the acid groups throughout the lens, with no effect upon the ester groups.

As an alternative to rendering the entire structure of the lens hydrophilic, the lens may be left in the basic solution for a relatively brief period of time. Upon removal from the dilute, aqueous, basic solution, all of the lens surfaces will be rendered hydrophilic through neutralization of the acid groups, while the core of the lens will be completely hydrophobic as none of the acid groups will have been neutralized. However, because the hydrophilic surfaces and the hydrophobic core are essentially of the same composition, the amount of optical distortion is significantly lessened and the danger of bacterial infection is similarly lessened, as the bacteria cannot easily penetrate the hydrophobic core of the lens.

A different form of contact lens, within this invention, may be formed in a manner somewhat different from that just described. Prior to being cut into discs, the rod is placed in contact with the referenced basic solution for a period of time determined by the depth of penetration desired. The rod is then removed from the solution and the center of the rod will be hydrophobic, while its surface will be hydrophilic. Discs can then be cut from this rod, the center of the disc being hydrophobic and the circumference being hydrophilic.

DESCRIPTION OF THE PREFERRED EMBODIMENTS

As described, the present invention relates to an acrylic copolymer having surfaces which are hydrophilic, while the central portion or core of the copolymerized material remains hydrophobic, or to an acrylic polymer, the entire thickness of which has been rendered hydrophilic. This is accomplished through a bulk copolymerization of the copolymerization mixture in a casting cell, followed by a treatment with a basic solution.

Figure 1:
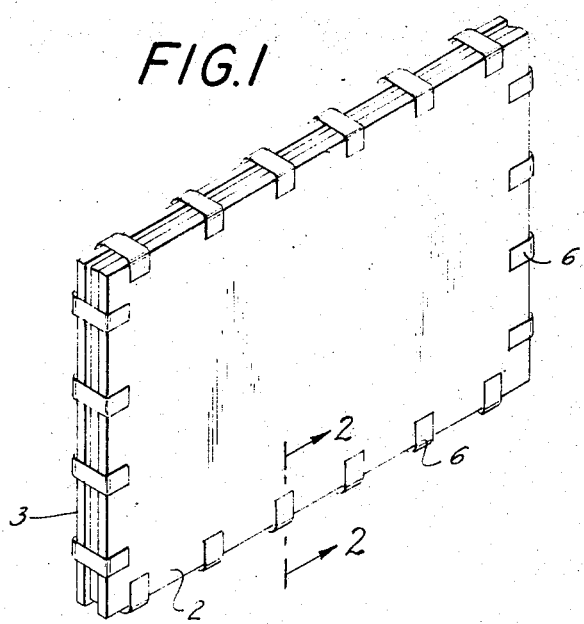
FIG. 1 is a perspective of a standard, rectangular casting cell.

The casting cell illustrated in FIG. 1 is a verison which can be employed for many purposes. The cell 1 includes two planar surfaces 2 and 3 spaced apart to provide a hollow 4 in which the copolymerization mixture is polymerized. The planar surfaces 2 and 3 are formed of suitable materials, such as glass, polypropylene, polyethylene, etc., which will allow removal of the polymerized mixture, following completion of the reaction. The planar surfaces 2 and 3 are held spaced apart by a gasket 5, shown in circular section, though this configuration is not essential. The gasket is formed of a suitable material which will not interfere with the polymerization reaction and such materials include polyvinylchloride, and rubber. The casting cell is held together through use of a plurality of clamps 6 which hold the plates together along the periphery. A suitable type of clamp is the set screw clamp 7 illustrated in FIG. 2. The copolymerization mixture is placed within the space 4, as previously described, in order to polymerize it, in a manner to be described further in the specification, after the casting cell has been assembled. When polymerization is completed, the clamps are removed from the cell, and the planar surfaces and gasket are removed to provide the final polymer product.

Figure 3:
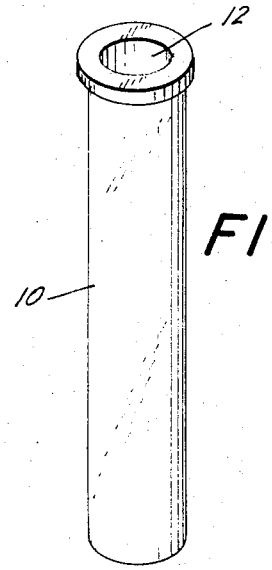
FIG. 3 is a perspective of a cylindrical casting cell for use in the present invention.

The shape of the casting cell can be modified, without affecting the operation, when the copolymer is desired for various special purposes. The cylindrical casting cell of FIG. 3 is an illustration of such a modified cell. It includes a cylindrical wall 10 having a closed bottom 11 and an opening 12. The copolymerization mixture is placed in this cell through the opening and, after polymerization, can be removed through this opening. If desired, the cylindrical casting cell can be formed in two pieces (not illustrated) which can be clamped together prior to placing the copolymerization mixture in the cell, with the clamps removed after polymerization in order to remove the cylindrically formed polymer product.

The copolymerization mixture includes, as essential components, methyl methacrylate and acrylic acid. The amount of methyl methacrylate varies from 75 to 92%, preferably from 80% to 90%, and most preferably from 85% to 88%. The acrylic acid is employed in amounts of from 8 to 25%, preferably from 10% to 20%, and most preferably from 12% to 15%. If too little acrylic acid is used, there is too little water absorption following the treatment with a basic solution, while if excess acrylic acid is present, the ultimately formed product does not have sufficient structural stability. Further, because the material of the present invention is bulk copolymerized, it has a much higher molecular weight and, consequently, more structural stability than a similar material which has been suspension or emulsion polymerized. This is extremely valuable in forming contact lenses, implants for slow release of therapeutic solutions, and artificial body members.

The copolymerization mixture may also include various other components to achieve particular purposes. For example, additional strength can be obtained through use of a cross-linking agent. Cross-linking agents which can be so utilized include glycol-dimethacrylate, allyl methacrylate, and divinylbenzene, the latter being preferred. The amount of cross-linking agent present may vary between 0.5 and 1%, based upon the total weight of methyl methacrylate and acrylic acid.

If the ultimate material is to be employed for many uses other than optical quality contact lenses, such as implants, then a plasticizer may be incorporated into the material. Particularly useful plasticizers in this composition include butyl acrylate, 2-ethylhexyl methacrylate, stearyl acrylate, and other long chain esters of acrylic or methacrylic acid. The amount of plasticizer, when used, may vary up to about 20%, by weight, based upon the total of the methyl methacrylate and acrylic acid.

A further component of the copolymerization mixture is the catalyst. In general, the catalyst is selected from the class consisting of azo compounds and peroxides. In particular, the catalyst can be $\alpha,\alpha'$-azodiisobutyronitrile, which is preferred, benzoyl peroxide, and lauryl peroxide. Various other catalysts will be apparent to those skilled in the art. Additionally, the polymerization can be catalyzed by ultraviolet radiation. The preferred catalyst is employed because of its uniformity of action. The amount of catalyst used, regardless of the particular catalyst, can vary between 0.01% and 0.12%, by weight, based upon the total of methyl methacrylate and acrylic acid. Preferagly, the catalyst is employed in amounts ranging from 0.03% to 0.05%, by weight, based upon the combined weight of methyl methacrylate and acrylic acid.

As previously indicated, additional structural stability can be obtained in the copolymer through incorporation of cross-linking agents. Such a treatment, reduces, to some extent, the hydrophilic nature of the treated surface. If additional water absorption is desired, then a chain stopper may be incorporated into the copolymerization mixture. By reducing the average length of the copolymer chain, additional hydrophilic properties are introduced. A suitable chain stopper is dodecyl mercaptan, which can be employed in amounts of from 0.1% to 1%.

While other acrylic materials can be substituted for the methyl methacrylate and acrylic acid described, the results obtained are not as favorable. For example, some portion of the methyl methacrylate can be replaced by ethyl acrylate, methyl acrylate, ethyl methacrylate, and other short chain, alkane acrylates or methacrylates. However, such as substitution may affect the optical quality of the polymer. Similarly, methacryalic acid and similar monomers containing a carboxylic acid group can be employed in place of the acrylic acid.

Figure 2:
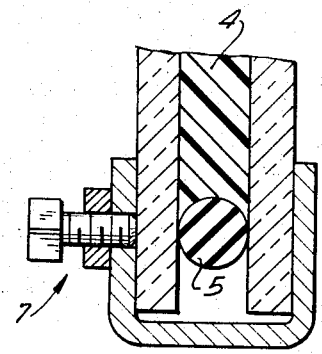
FIG. 2 is a fragmentary, sectional view of the casting cell of FIG. 1 along the line 2—2.

The casting cell illustrated in FIGS. 1 and 2, and other casting cells which may ge formed, can be formed of any of a variety of materials to which the copolymerized mixture will not adhere, so as to provide for easy removal, and which will not react with the reactants under the reaction conditions. Such materials of construction include glass, polyethylene, polypropylene, polytetrafluoroethylene, stainless steel, and others. Obviously, in addition to the properties previously mentioned, because the copolymerization is carried out at an elevated temperature, the material of which the casting cell is formed must provide for good heat transfer.

Following polymerization, the casting cell is opened and the copolymerized material is removed. Following removal, it may be mechanically formed and then treated with a mild, aqueous, basic solution, or may be treated immediately with such a basic solution. The basic solution employed to treat the copolymerized material may contain ammonium hydroxide, sodium hydroxide, potassium hydoxide, ethanol amines, sodium tripolyphosphate, etc. in water. The strength and concentration of this basic solution should be such as to provide only for neutralization of the acidic groups of the compolymer and not for saponification. Thus, the concentration of the solution may vary from about 0.1% to 5%, preferably 0.5% to 1%. While the temperature of treatment is not critical, ambient temperature is preferred for economic reasons. In any event, the temperature at which the neutralization is conducted should not exceed 60° C., as there is then a danger of saponifying the ester groups.

The time for which the copolymerized material is treated with the aqueous, basic solution can vary from a few minutes to 48 hours, depending upon the thickness and shape of the material, and the objects to be accomplished. If desired, for particular applications, only one surface of the copolymer need be rendered hydrophilic. This can be accomplished by suspending the hydrophobic copolymer, so that only a portion is within the basic solution. That portion of the copolymer which is not contacted by the basic solution remains hydrophobic.

In order to that those skilled in the art may be better enabled to practice the present invention, the following examples are given by way of illustration. All parts in these examples, unless otherwise indicated, are by volume.

Example 1

Figure 4:
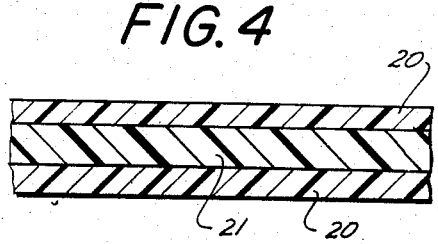
FIG. 4 is a sectional view of one form of the product of the present invention.

Into a casting cell of the type illustrated in FIG. 1, and formed of glass, a copolymerization mixture of 200 parts methyl methacrylate, 20 parts acrylic acid, and 0.1 part (by weight), $\alpha,\alpha'$-azodiisobutylronitrile were placed. The temperature of the copolymerization mixture was raised to 56° and held at that temperature for about 12 hours. The temperature of the copolymerization mixture was then raised to 95° C. and held at that temperature for an additional 2 hours. When the material was cooled and removed from the casting cell, it was found that an optically clear sheet had been formed. The sheet was immersed in a 5 percent solution of ammonium hydroxide for 1 hour. After removal from the ammonium hydroxide solution and drying, it was found that a sandwich structure, as illustrated in FIG. 4, had been formed. The hydrophilic layers 20 were approximately 1 to 2 mm. thick, and surrounded the hydrophobic layer 21.

Example 2

Figure 5:
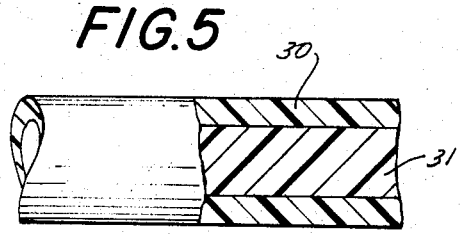
FIG. 5 is a view of a second form of a product of the present invention, partially in elevation and partially in section.
Figure 6:
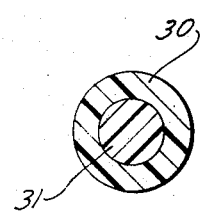
FIG. 6 is an elevational view of one form of the optical contact lens according to the present invention.

Employing the same copolymerization mixture as in FIG. 1, but with a casting cell formed as in FIG. 3, and otherwise employing the same treatment as described in Example 1, a cylindrical copolymeric material was formed, having a hydrophilic circumference, as illustrated in FIG. 5. The hydrophilic layer 30 of this material was approximately 1 mm. thick, and surrounded the hydrophobic layer 31. Discs are cut from this treated rod and can be used as optical contact lenses. The faces of the disc are as shown in FIG. 6 with the hydrophilic circumference 30 of the original rod surrounding the hydrophobic center or core 31.

Example 3

Into a casting cell formed in the same manner as in Example 1, but having polytetrafluoroethylene liners, a mixture of 170 parts methyl methacrylate, 30 parts acrylic acid, and 1 part $\alpha,\alpha'$-azodiisobutyronitrile (by weight) was placed. The copolymerization mixture was heated at 45° C. for 24 hours, at 56° C. for 24 hours, and then at 90° C. for 2 hours. The mixture was then cooled and the resulting hard sheet was removed from the casting cell. The sheet was cut into buttons having a diameter of approximately 20 mm. and these buttons were formed into lenses, and polished, according to techniques well known in the art. The finished lenses were placed in a 1% aqueous solution of sodium hydroxide for 6 hours. During this treatment, the diameters increased in accordance with the changes previously indicated for such treatments of fully hydrophilic lenses. The lens was removed from the solution and allowed to dry at room temperature. The dried lens was placed in an isotonic solution for a period of one hour, in order to remove any remaining traces of sodium hydroxide, and was again dried. A vacuum was employed to increase the rate of drying. The lens was then placed in a fresh isotonic solution and was ready for use. The weight of the lens, thus treated, was 3.5 times the weight of the untreated copolymer lens, and tests indicated that the acid groups of the copolymer had been completely neutralized while the ester groups were not affected.

The intrinsic viscosity of this material in methyl ethyl ketone at 25° C. was 3.95.

While a vacuum was employed to increase the rate of drying, such a condition is not required and the same results are obtained without the vacuum, but over a longer period of time.

Example 4

Employing the same equipment and the same techniques as used in Example 3, a copolymer was formed employing 84.5 parts methyl methacrylate, 15 parts acrylic acid, 0.5 part divinylbenzene, and 0.05 part (by weight), $\alpha,\alpha'$-azodiisobutyronitrile. On full hydration, as accomplished in Example 3, the weight of the lenses increased approximately two fold. The lensing resulting from the formulation of this example was slightly harder than that formed according to Example 3.

Example 5

In the same manner, and employing the same conditions as in Example 3, a copolymer was formed from 84 parts methyl methacrylate, 15 parts acrylic acid, 0.5 part 1-dodecanthiol, and 0.05 part (by weight) $\alpha,\alpha'$-azodiisobutyronitrile. Upon complete hydration, the lenses showed a weight increase of approximately 450%. The lenses were much softer than those formed according to Example 3 and more difficult to handle because of this.

Example 6

The lens of Example 3 was placed in a solution of pilocarpine. Within 1 hour, a sufficient amount of the pilocarpine was absorbed in the lens so that the lens could be applied to an eye and provide a sustained release of the substance onto the eye.

Example 7

In a cylindrical casting cell, as illustrated in FIG. 3, formed of glass, a copolymerization mixture consisting of 75 parts methyl methacrylate, 15 parts acrylic acid, 10 parts ethyl hexyl methacrylate, and 0.03 part (by weight) of $\alpha,\alpha'$-azodiisobutyronitrile was placed. Polymerization was carried out in the same manner as in Example 1. The rods resulting from this copolymerization were rendered hydrophilic employing basic solutions as described in Example 1, for varying time periods so as to control the depth of treatment. These rods were treated with therapeutic materials, such as pilocarpine, and were found to absorb these materials and to subsequently release them at a controlled rate.

In addition to the properties noted above, the copolymer prepared according to the present invention will swell significantly after it has been treated to render it hydrophilic. In fact, this swelling can take place because of absorption of fluids from the surroundings. This property is particularly valuable in a variety of applications where a member must be inserted in a relatively shrunken condition, but swells, in situ, to accomplish the desired function. Additionally, as will be apparent, various medicaments can be adsorbed on the hydrophilic surface for application to particular body members.

A further object related to the materials of the present invention is a non-fogging material which is formed in the same manner as just described for the contact lens, employing the same materials and equipment, except that the casting cell of FIG. 1 must be formed of glass. When the resulting hydrophilic material is subjected to water vapors, it remains clear for a substantially longer period of time than other presently known materials. For example, when a hydrophilic copolymer in this form was above a 400 cc. beaker containing 100 cc. of water at 65° C., the surfaces had not fogged after 90 to 150 seconds. By comparison, untreated polymethyl methacrylate fogged after 2 seconds, while commercial, non-fogging plastic lenses made of coated polycarbonate fogged after 7 to 12 seconds. Similarly, when the material of the present invention was kept in a freezer at −5° C. and was then brought to room temperature at 25° C. in a chamber with a relative humidity of 75%, no fogging occurred. Polymethyl methacrylate under the same conditions fogged immediately.

The following examples will illustrate the preparation of a non-fogging material as just described, in order that those skilled in the art may be better enabled to practice this portion of the invention. All parts in these examples, as previously, are by volume unless otherwise indicated.

Example 8

A mixture of 85 parts methyl methacrylate, 15 parts acrylic acid, 0.03 part α,α′-azodiisobutyronitrile, and 0.05 part (by weight) of stearic acid, was polymerized in a glass casting cell as illustrated in FIG. 1. The polymerization temperature was held at 45 to 55° C. for 12 hours, and was then raised to 80° C. for 3 hours. After cooling, a clear sheet was obtained from the casting cell. This sheet was formed into the shape of a goggle which was treated with a 0.5% solution of sodium hydroxide for 3 hours. After drying, the goggle was non-fogging on both surfaces.

Example 9

A goggle was made in the same manner as in Example 8, except that 0.1 part, by weight, of 1-dodecanthiol was added to the copolymerization mixture and the material was treated with a 0.2% solution of sodium hydroxide. The resulting goggle, while non-fogging as in Example 8, was more hydrophilic and had a lower softening temperature, allowing easier formation of desired shapes.

Thus, an improved method for forming copolymers having hydrophilic surfaces, and such copolymers, have been shown.

I claim:

1. A copolymer having a hydrophilic surface formed by the bulk copolymerization, at an initial temperature of 40° C. to 65° C. and a final temperature of approximately 80° C. to 95° C. in a casting cell, of from 75 to 92 percent methyl methacrylate and from 8 to 25 percent acrylic acid, by volume, the acid groups of the acrylic acid, at least on the surface, having been completely neutralized with a mild, basic solution, the ester groups on the copolymer being unchanged.

2. The copolymer of claim 1 having from 80 percent to 90 percent methyl methacrylate and from 20 percent to 10 percent acrylic acid.

3. The copolymer of claim 1 wherein the acid groups of the acrylic acid are neutralized on only one surface.

4. The copolymer of claim 1 having incorporated therein from 0.5 to 1 percent of a cross-linking agent.

5. The copolymer of claim 1 having incorporated therein from 0.1 to 1 percent of a chain stopper.

6. The copolymer of claim 1 wherein the acid groups of the acrylic acid have been neutralized throughout.

7. The copolymer of claim 6 charged with a therapeutic agent.

8. Non-fogging objects formed from the copolymer of claim 1.

9. Non-fogging objects made from the copolymer of claim 5.

References Cited

UNITED STATES PATENTS

| 2,244,702 | 6/1941 | Hubbuch | 260—86.1 R |
| 2,244,703 | 6/1941 | Hubbuch | 260—80 P |
| 3,221,083 | 11/1965 | Crandon | 264—1 |
| 3,431,226 | 3/1969 | Warson et al. | 260—80.8 |
| 3,458,466 | 7/1969 | Lee | 260—86.1 R |

HARRY WONG, Jr., Primary Examiner

U.S. Cl. X.R.

204—159.22; 260—78.5 R, 80.72, 80.8, 89.5 A; 264—1; 424—273